United States Patent
Chen et al.

(10) Patent No.: US 10,969,906 B2
(45) Date of Patent: Apr. 6, 2021

(54) CONTROL METHOD FOR TOUCH DEVICE

(71) Applicant: Compal Electronics, Inc., Taipei (TW)

(72) Inventors: Huang-Chih Chen, Taipei (TW); Yueh-Hsiang Chen, Taipei (TW); Kun-Chi Pan, Taipei (TW); Yu-Cheng Hsu, Taipei (TW); Chung-Han Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/690,347

(22) Filed: Nov. 21, 2019

(65) Prior Publication Data

US 2021/0048916 A1 Feb. 18, 2021

(30) Foreign Application Priority Data

Aug. 14, 2019 (TW) .................. 108128959

(51) Int. Cl.
*G06F 3/041* (2006.01)
*G06F 3/044* (2006.01)

(52) U.S. Cl.
CPC .......... *G06F 3/0418* (2013.01); *G06F 3/0414* (2013.01); *G06F 3/0446* (2019.05); *G06F 2203/04106* (2013.01)

(58) Field of Classification Search
CPC ............... G06F 3/0418; G06F 3/0446; G06F 2203/04106; G06F 3/044; G06F 3/043; G06F 3/04144; G06F 3/04142; G06F 3/0414; G06F 3/0447; G06F 2203/04105; G06F 3/0445; G06F 3/04166

USPC .................................................. 345/173–174
See application file for complete search history.

(56) References Cited

U.S. PATENT DOCUMENTS

| | | | |
|---|---|---|---|
| 6,492,979 B1 * | 12/2002 | Kent | G06F 3/0447 345/173 |
| 9,977,537 B2 | 5/2018 | Molne et al. | |
| 10,104,270 B2 | 10/2018 | Kim et al. | |
| 10,152,173 B2 | 12/2018 | Qu et al. | |
| 10,184,856 B2 | 1/2019 | Ueno et al. | |
| 2016/0188069 A1 * | 6/2016 | Tao | G06F 3/0414 345/173 |
| 2018/0059866 A1 * | 3/2018 | Drake | G06F 3/0416 |
| 2018/0224963 A1 * | 8/2018 | Lee | G06F 3/0488 |

FOREIGN PATENT DOCUMENTS

| | | |
|---|---|---|
| TW | I550460 B | 9/2016 |
| TW | I567611 B | 1/2017 |
| TW | I582666 B | 5/2017 |

* cited by examiner

*Primary Examiner* — Kent W Chang
*Assistant Examiner* — Sujit Shah
(74) *Attorney, Agent, or Firm* — Kirton McConkie; Evan R. Witt

(57) ABSTRACT

The present disclosure provides a control method for a touch device. The control method of the touch device allows the plurality of pressure sensors to be activated to detect the pressure on the touch position of the touch panel while the capacitive touch sensor is probably invalid and the touch device is abnormal. Therefore, the touch device works continuously when the capacitive touch sensor is probably invalid.

11 Claims, 15 Drawing Sheets

CONTROL METHOD FOR TOUCH DEVICE

CROSS-REFERENCE TO RELATED APPLICATION

This application claims priority to Taiwan Patent Application No. 108128959 filed on Aug. 14, 2019, the entire contents of which are incorporated herein by reference for all purposes.

FIELD OF THE DISCLOSURE

The present disclosure relates to a control method for the touch device, and more particularly to a control method for the touch device capable of being used and avoiding abnormal manipulation while the touch device is in contact with water.

BACKGROUND OF THE DISCLOSURE

With the progress of technology, a variety of touch devices are developed and extensively used. Compared to the conventional operation method of using mouse or physical buttons, the touch operation method of using a finger or a stylus pen to directly touch on the display is easier and user-friendly. The conventional touch device detects the touch input of user through a capacitance circuit so that the two-dimensional coordinate position (x, y) of the touch input on the touch device is acquired. Therefore, the application program or the command corresponding to the touch input of the user is selected and executed.

Moreover, with the progress of the pressure detection technology, the touch device with pressure detection function is more popular. The touch panel of the touch device detects the two-dimensional coordinate position (x, y) of the touch input by the projected capacitive technology (Pro-Cap). After the touch device confirms the force is applied on the coordinate position, the control instruction is issued to control the touch device.

However, the capacitance circuit recognizes the touch input on the touch device according to the capacitance variation. When water or liquid is in contact with the touch device or the user uses a tool without capacitance sensing ability (for example a pen or a card) to perform the touch input on the touch device, the capacitance circuit of the touch device fails to work. Moreover, the pressure detection film disposed in the touch device only detects magnitude of the force exerted on the pressure detection film and cannot acquire the coordinate position of the force exerted on the pressure detection film. Therefore, when the capacitance circuit of the touch device fails to work, the touch device is malfunctioned and can't be used by the user. Moreover, since the touch device with the pressure detection function fails to acquire the two-dimensional coordinate position (x, y) of the touch input, the pressure detection function of the touch device is invalid. Therefore, the conventional touch device is inconvenient to use.

Therefore, there is a need of providing a control method for a touch device in order to address the above issues encountered by the prior arts.

SUMMARY OF THE DISCLOSURE

The present disclosure provides a control method for the touch device. The control method for the touch device is capable of being used and avoiding abnormal manipulation while the touch device is in contact with water.

In accordance with an aspect of the present disclosure, a control method for a touch device is provided. The touch panel comprises a capacitive touch sensor and a plurality of pressure sensors. The capacitive touch sensor detects a touch position of an external force applied on the touch panel. The plurality of pressure sensors detects a pressure on the touch position. The plurality of pressure sensors are disposed around the periphery of the touch panel. The control method comprises the following steps. Firstly, a step S1 is performed. In the step S1, whether the capacitive touch sensor is abnormal is detected. If the detection result of the step S1 is satisfied, the step S2 is performed. In the step S2, the capacitive touch sensor is allowed to be inactivated under control of a processor. The plurality of pressure sensors are allowed to be activated to detect the pressure on the touch position under the control of the processor. Then, a step S3 is performed. In the step S3, whether the pressure detected with each of the plurality of pressure sensors is greater than at least one predetermined pressure value is determined. A plurality of report values are assigned according to the intervals to which the pressure values detected by the plurality of pressure sensors belong. Then, a step S4 is performed. In the step S4, the plurality of report values associated with the plurality of pressure sensors is compared with a truth table, so that the touch position of the external force applied on the touch panel is confirmed. If the detection result of the step S1 is not satisfied, the step S5 is performed. In the step S5, the capacitive touch sensor is allowed to detect the touch position under control of the processor. Then, a step S6 is performed. In the step S6, the touch position of the external force applied on the touch panel is confirmed according to a detection information from the capacitive touch sensor and a detection information from the plurality of pressure sensors by the processor.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
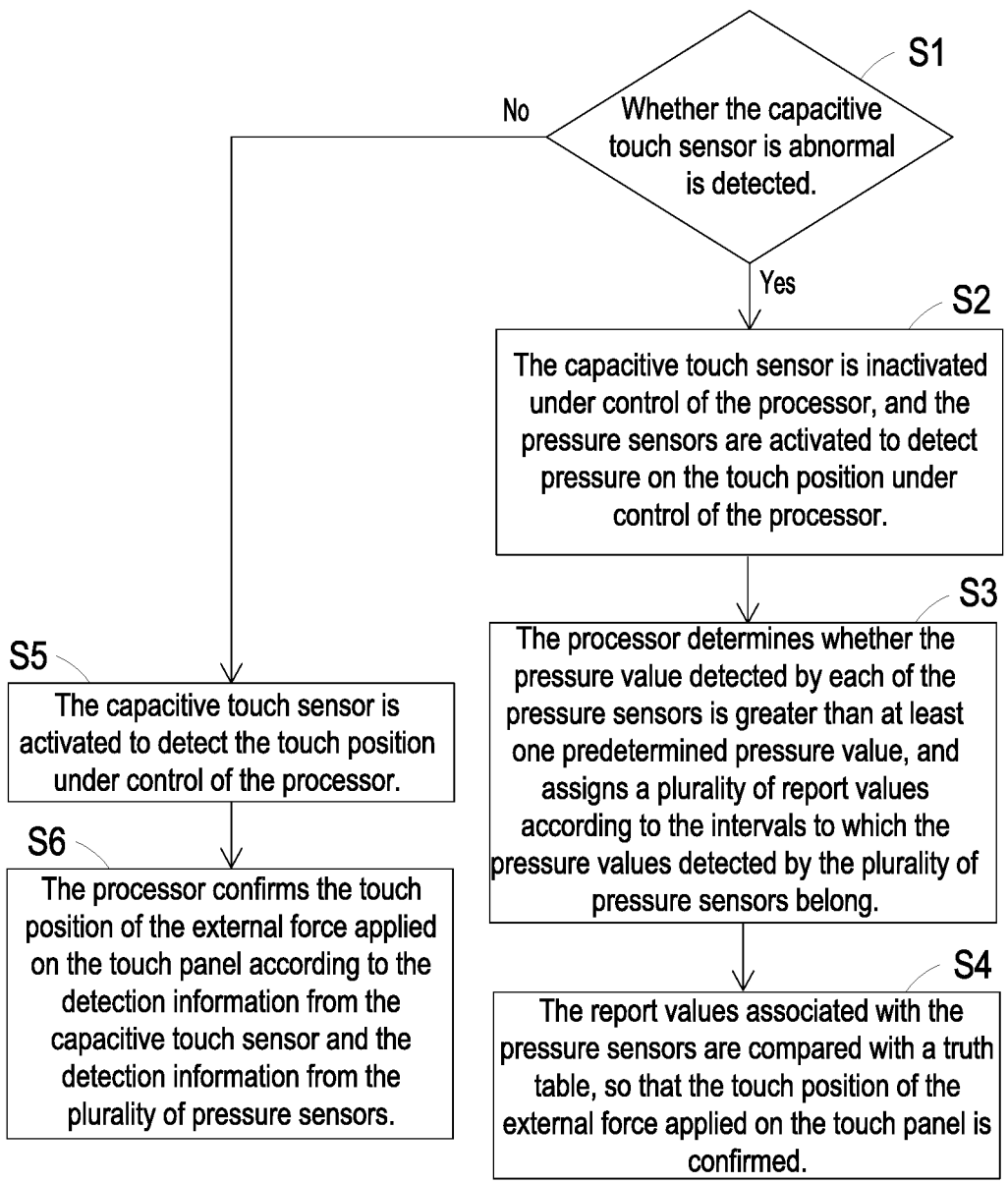
FIG. 1 is a flowchart illustrating a control method for a touch device according to a first embodiment of the present disclosure.
Figure 2:
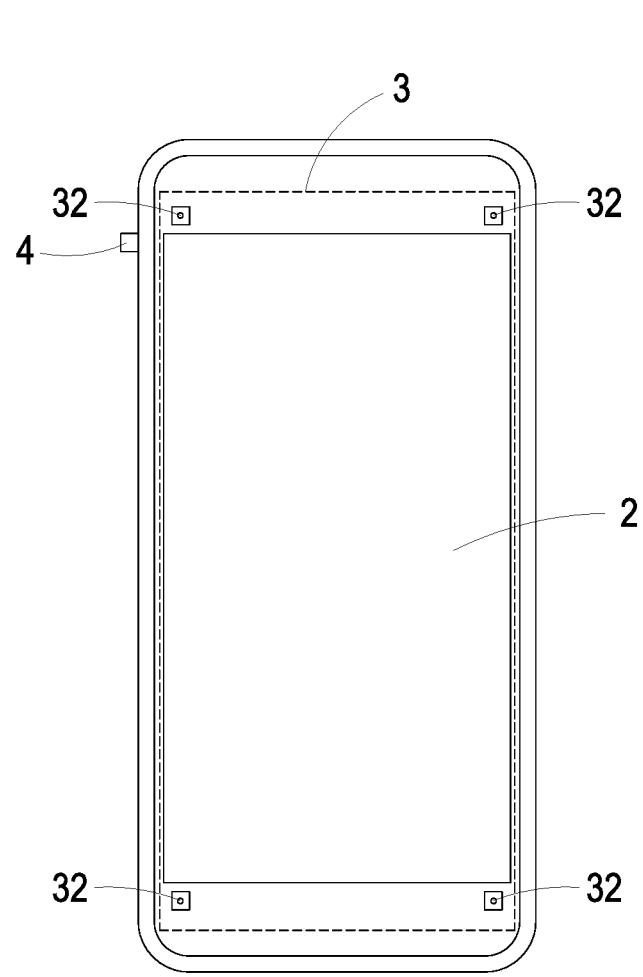
FIG. 2 is a schematic perspective view illustrating an exemplary touch device capable of executing the control method of FIG. 1.
Figure 3:
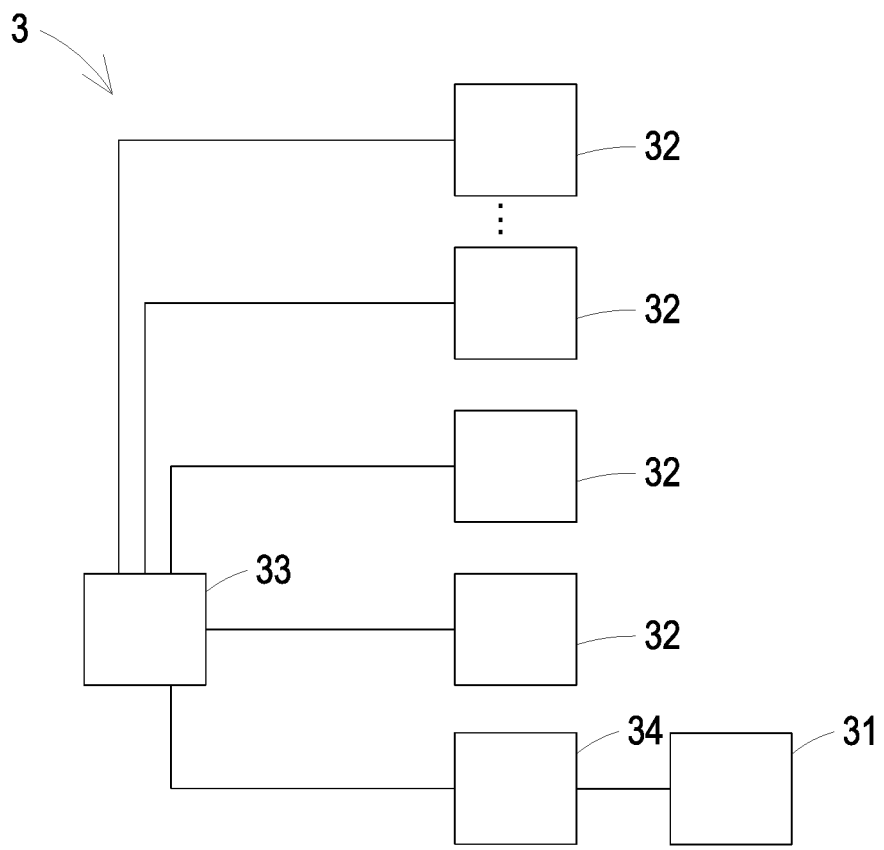
FIG. 3 is a schematic perspective view illustrating a control system of the touch device of FIG. 2.

FIG. 1 is a flowchart illustrating a control method for a touch device according to a first embodiment of the present disclosure. FIG. 2 is a schematic perspective view illustrating an exemplary touch device capable of executing the control method of FIG. 1. FIG. 3 is a schematic perspective view illustrating a control system of the touch device of FIG. 2. As shown in FIGS. 1, 2 and 3, the control method of the present disclosure is applied to the touch device 1 of FIG. 2. Preferably but not exclusively, the touch device 1 is a portable electronic device such as a mobile phone or a tablet. The touch device 1 includes a touch panel 2 and a control system 3. The touch panel 2 is disposed on the surface of the touch device 1. The user can perform a touch input by exerting an external force on the touch panel 2 so as to control the touch device 1.

The control system 3 is disposed within the touch device 1 and includes a capacitive touch sensor 31, a plurality of pressure sensors 32, a processor 33 and a controller 34. The capacitive touch sensor 31 is disposed on a side of the touch panel 2 and has a plurality of electrode grids to cover the touch panel 2 completely. While the user applies the external force on the touch panel 2 by finger (or touch object), the capacitance quantity of the capacitive touch sensor 31 is changed. Consequently, the capacitive touch sensor 31 detects the touch position of the external force applied on the touch panel 2. The controller 34 provides the detection information from the capacitive touch sensor 31 to the processor 33. The processor 33 determines the touch position of the external force and executes the function corresponding to the touch position. For example, the processor 33 executes camera function, stopwatch function or flashlight function according to the touch position of the external force applied on the touch panel 2. The plurality of pressure sensors 32 are disposed on at least one side of the touch panel 2 and disposed around the periphery of the touch panel 2. When the user applies the external force on the touch panel 2, at least one pressure sensor 32 which is adjacent to the touch position of the external force can detect a variation of the pressure on the touch panel 2 or may be subjected to a deformation. Moreover, the pressure sensor 32 includes an analog-to-digital converter (not shown) disposed therein. The pressure sensor 32 converts the variation of the pressure to the detection information through the analog-to-digital converter and provides the detection information to the processor 33. The processor 33 determines the touch position of the external force applied on the touch panel 2 according to the detection information from all of the plurality of pressure sensors 32. Then, the processor 33 executes the function corresponding to the touch position, for example executing camera function, stopwatch function or flashlight function.

In some embodiments, the capacitive touch sensor 31 is invalid and fails to detect the touch position of the external force applied on the touch panel 2 accurately while the external environment of the touch device 1 is changed. For example, the touch device 1 is in contact with water or the touch device 1 is located under the water. Meanwhile, the capacitive touch sensor 31 of the touch device 1 is abnormal. When the capacitive touch sensor 31 of the touch device 1 is abnormal, the capacitive touch sensor 31 is inactivated under control of the processor 33. The plurality of pressure sensors 32 are activated to detect the pressure on the touch position under control of the processor 33. When the capacitive touch sensor 31 of the touch device 1 is normal, the capacitive touch sensor 31 is activated to detect the touch position under control of the processor 33, and the plurality of pressure sensors 32 are selectively activated to detect the pressure on the touch position under control of the processor 33.

The processor 33 is electrically connected with the capacitive touch sensor 31 through the controller 34. The processor 33 is electrically connected with each of the plurality of pressure sensors 32. The processor 33 determines whether the touch device 1 is abnormal according to the detection signal from the capacitive touch sensor 31 and controls the operations of the capacitive touch sensor 31 and the plurality of pressure sensors 32 according to the determining result. When the touch device 1 is normal, the touch device 1 detects the touch position through the capacitive touch sensor 31 directly. In some embodiments, the plurality of pressure sensors 32 are selectively activated to detect the pressure on the touch position under control of the processor 33. The processor 33 confirms the touch position of the external force applied on the touch panel 2 according to the detection information from the capacitive touch sensor 31 and the detection information from the plurality of pressure sensors 32 simultaneously. Moreover, when the touch device 1 is abnormal, the plurality of pressure sensors 32 are activated to detect the pressure on the touch position under control of the processor 33, and the capacitive touch sensor 31 is inactivated to detect the touch position of external force under control of the processor 33. The processor 33 determines whether the pressure value detected by each of the plurality of pressure sensors 32 is greater than at least one predetermined pressure value. The processor 33 outputs a plurality of report values according to the intervals to which the pressure values detected by the plurality of pressure sensors 32 belong. Moreover, the processor 33 includes a truth table prestored therein. The truth table records the information of the touch positions of various external forces applied on the touch panel 2 corresponding to the different report values of the plurality of pressure sensors 32. The processor 33 compares the report values established by the plurality of pressure sensors 32 with the truth table so as to confirm the touch position of the external force applied on the touch panel 2.

The control method of the touch device 1 of the present disclosure is shown in FIG. 1. Firstly, a step S1 is performed. In the step S 1, whether the capacitive touch sensor 31 is abnormal is detected. If the detection result of the step S1 is satisfied (i.e. the capacitive touch sensor 31 is abnormal), a step S2 is performed. In the step S2, the capacitive touch sensor 31 is inactivated under control of the processor 33, and the plurality of pressure sensors 32 are activated to detect pressure on the touch position under control of the processor 33. Then, a step S3 is performed. In the step S3, the processor 33 determines whether the pressure value detected by each of the plurality of pressure sensors 32 is greater than at least one predetermined pressure value, and issues a plurality of report values according to the intervals to which the pressure values detected by the plurality of pressure sensors 32 belong. Then, a step S4 is performed. In the step S4, the plurality of report values associated with the plurality of pressure sensors 32 are compared with a truth table. Therefore, the touch position of the external force applied on the touch panel 2 is confirmed.

If the detection result of the step S1 is not satisfied (i.e. the capacitive touch sensor 31 is normal), a step S5 is performed. In the step S5, the capacitive touch sensor 31 is activated to detect the touch position under control of the processor 33. In some embodiments, the plurality of pressure sensors 32 are selectively activated to detect the pressure on the touch position. Then, a step S6 is performed. In the step S6, the processor 33 confirms the touch position of the external force applied on the touch panel 2 according to the detection information from the capacitive touch sensor 31 and the detection information from the plurality of pressure sensors 32.

From the above descriptions, the control method of the touch device 1 allows the plurality of pressure sensors 32 to be activated to detect the pressure on the touch position of the touch panel 2 while the capacitive touch sensor 31 is probably invalid and the touch device 1 is abnormal. Therefore, the touch device 1 works continuously when the capacitive touch sensor 31 is probably invalid.

In some embodiments, the touch panel 2 includes a plurality of actual touch areas. The touch position is corresponding to at least one actual touch area. The truth table prestored in the processor 33 records the information of the actual touch areas of the touch panel 2 corresponding to the different report values of the plurality of pressure sensors 32. The processor 33 compares the report values associated with the plurality of pressure sensors 32 with the truth table, so that the processor 33 confirms the actual touch area to which the touch position of the external force applied on the touch panel 2 belongs. Each of the plurality of actual touch areas is corresponding to a function, for example camera function, stopwatch function or flashlight function. After the process 33 determines the actual touch area to which the touch position of the external force applied on the touch panel 2 belongs, the processor 33 executes the function corresponding to the actual touch area. An exemplary embodiment illustrating how the processor 33 determines the actual touch area to which the touch position of the external force belongs according to the comparison with the report values associated with the plurality of pressure sensors 32 with the truth table will be described as follows.

Figure 4A:
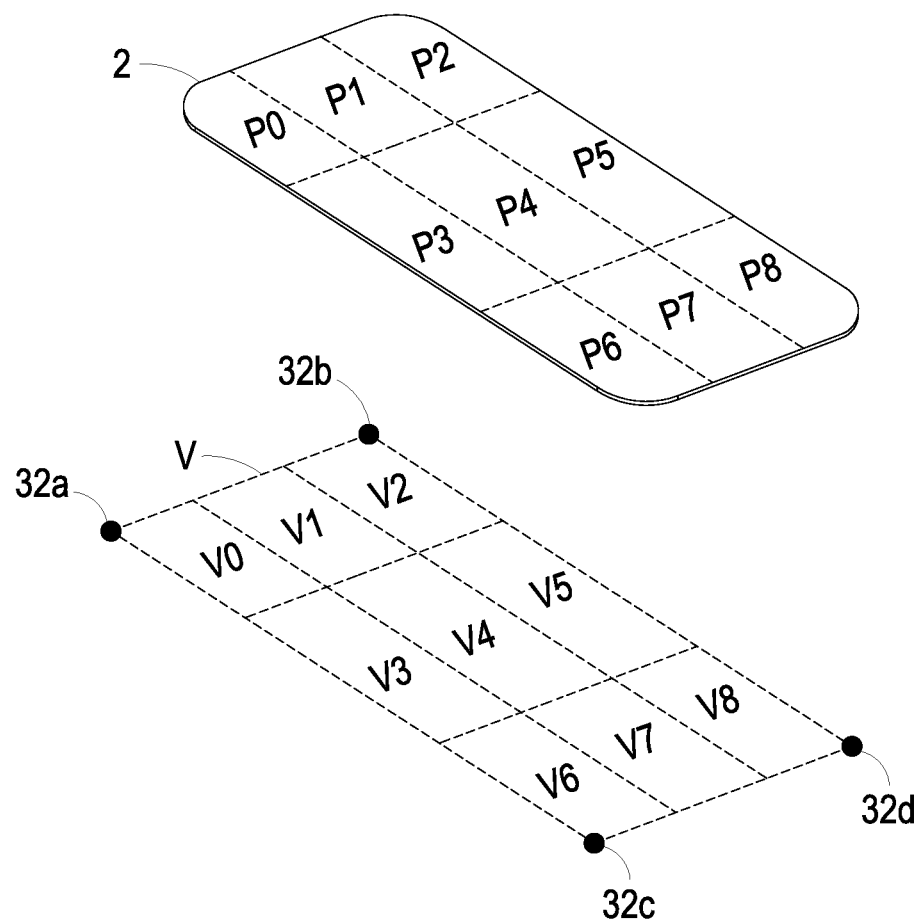
FIG. 4A is a schematic exploded view illustrating a touch panel, a capacitive touch sensor and a plurality of pressure sensors of the touch device of FIG. 2 according to the first embodiment of the present invention.
Figure 4B:
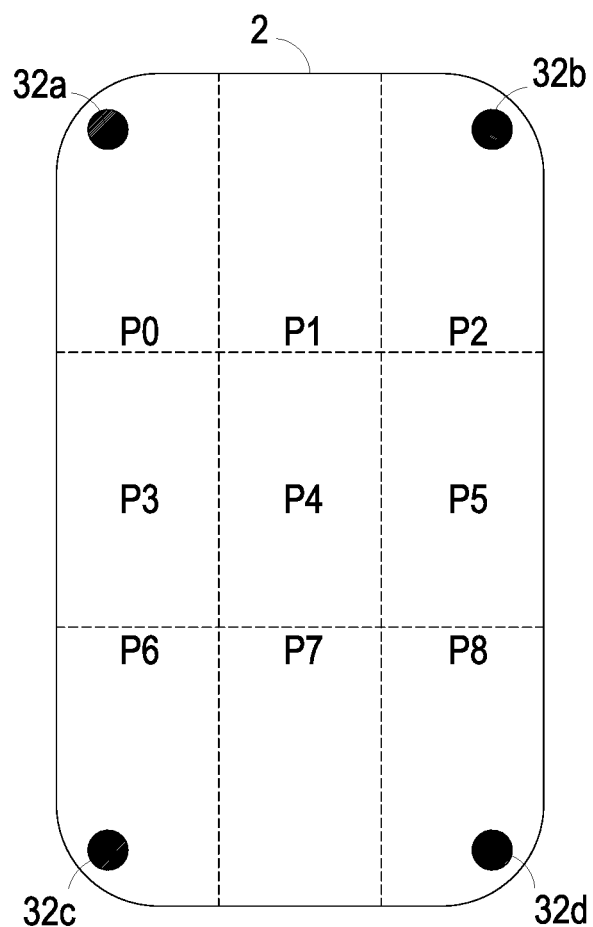
FIG. 4B is a schematic perspective view illustrating the assembly of the touch panel, the capacitive touch sensor and the plurality of pressure sensors of the touch device of FIG. 4A.

FIG. 4A is a schematic exploded view illustrating a touch panel, a capacitive touch sensor and a plurality of pressure sensors of the touch device of FIG. 2 according to the first embodiment of the present invention. FIG. 4B is a schematic perspective view illustrating the assembly of the touch panel, the capacitive touch sensor and the plurality of pressure sensors of the touch device of FIG. 4A. Table 1 is an exemplary truth table recording the information of the actual touch area of the touch device corresponding to different report values associated with the plurality of pressure sensors. In this embodiment, as shown in FIGS. 4A and 4B, the touch panel 2 includes nine actual touch areas P0, P1, P2, P3, P4, P5, P6, P7 and P8. The nine actual touch areas P0, P1, P2, P3, P4, P5, P6, P7 and P8 are distributed on the touch panel 2 evenly and arranged in a matrix of three rows and three columns. The nine actual touch areas P0, P1, P2, P3, P4, P5, P6, P7 and P8 are arranged on the touch panel 2 sequentially. From left to right, the three actual touch areas P0, P1, P2 are arranged on the first row of the touch panel 2 sequentially. From left to right, the three actual touch areas P3, P4, P5 are arranged on the second row of the touch panel 2 sequentially. From left to right, the three actual touch areas P6, P7, P8 are arranged on the third row of the touch panel 2 sequentially. Moreover, the touch device 1 includes four pressure sensors 32 for example the pressure sensors 32a, 32b, 32c and 32d as shown in FIG. 4A. The four pressure sensors 32a, 32b, 32c and 32d are collectively configured as a virtual touch panel V. The virtual touch panel V includes a plurality of virtual touch areas for example nine virtual touch areas V0, V1, V2, V3, V4, V5, V6, V7 and V8. Each of the nine virtual touch areas is corresponding in position to one of the plurality of actual touch areas. For example, the virtual touch area V0 is corresponding in position to the actual touch area P0. The virtual touch area V1 is corresponding in position to the actual touch area P1. The virtual touch area V2 is corresponding in position to the actual touch area P2. The virtual touch area V3 is corresponding in position to the actual touch area P3. The virtual touch area V4 is corresponding in position to the actual touch area P4. The virtual touch area V5 is corresponding in position to the actual touch area P5. The virtual touch area V6 is corresponding in position to the actual touch area P6. The virtual touch area V7 is corresponding in position to the actual touch area P7. The virtual touch area V8 is corresponding in position to the actual touch area P8. The four pressure sensors 32a, 32b, 32c and 32d are disposed around the periphery of the touch panel 2. Preferably but not exclusively, the four pressure sensors 32a, 32b, 32c and 32d are disposed at four corners of the touch panel 2. The pressure sensor 32a is adjacent to the virtual touch area V0. The pressure sensor 32b is adjacent to the virtual touch area V2. The pressure sensor 32c is adjacent to the virtual touch area V6. The pressure sensor 32d is adjacent to the virtual touch area V8.

In this embodiment, the at least one predetermined pressure value includes a first pressure threshold value. When the external force is applied on the touch panel 2 by the user, the processor 33 determines whether the pressure value detected by each of the plurality of pressure sensors 32a, 32b, 32c, 32d is greater than the first pressure threshold value. The processor 33 assigns one of a first valve and a second value to each of the plurality of pressure sensors 32a, 32b, 32c, 32d as the respective report values of the pressure sensors 32a, 32b, 32c, 32d according to the determining results. Namely, when the pressure value detected by the pressure sensor 32a, 32b, 32c, 32d is lower than the first pressure threshold value, the processor 33 assigns the first value, for example but not limited to 0, to the pressure sensor 32a, 32b, 32c, 32d as the report value. Otherwise, when the pressure value detected by the pressure sensor 32a, 32b, 32c, 32d is greater than the first pressure threshold value, the processor 33 assigns the second value, for example but not limited to 1, to the pressure sensor 32a, 32b, 32c, 32d as the report value. For example, when the pressure value detected by the pressure sensor 32a is lower than the first pressure threshold value, the report value of the pressure sensor 32a is established as the first value. Similarly, when the pressure value detected by the pressure sensor 32b is lower than the first pressure threshold value, the report value of the pressure sensor 32b is established as the first value. Otherwise, when the pressure value detected by the pressure sensor 32a is greater than the first pressure threshold value, the report value of the pressure sensor 32a is established as the second value, and so on.

The plurality of report values associated with the plurality of pressure sensors 32a, 32b, 32c, 32d are compared with the truth table by the processor 33. According to the comparing results, the processor 33 determines the virtual touch areas V0, V1, V2, V3, V4, V5, V6, V7, V8 to which the touch position of the external force applied on the touch panel 2 belongs, so that the actual touch areas P0, P1, P2, P3, P4, P5, P6, P7, P8 to which the touch position belongs are determined. As shown in table 1, when the report value of the pressure sensor 32a is the second value (i.e. 1), the report value of the pressure sensor 32b is the first value (i.e. 0), the report value of the pressure sensor 32c is the first value (i.e. 0) and the report value of the pressure sensor 32d is the first value (i.e. 0), the processor 33 determines the actual touch area to which the touch position of the external force applied on the touch panel 2 belongs is P0 according to the comparison between the report values and the truth table of table 1. When the report value of the pressure sensor 32a is the first value (i.e. 0), the report value of the pressure sensor 32b is the second value (i.e. 1), the report value of the pressure sensor 32c is the first value (i.e. 0) and the report value of the pressure sensor 32d is the first value (i.e. 0), the processor 33 confirms the actual touch area to which the touch position of the external force applied on the touch panel 2 belongs is P2 according to the comparison between the report values and the truth table of table 1. When the report value of the pressure sensor 32a is the first value (i.e. 0), the report value of the pressure sensor 32b is the first value (i.e. 0), the report value of the pressure sensor 32c is the second value (i.e. 1) and the report value of the pressure sensor 32d is the first value (i.e. 0), the processor 33 confirms the actual touch area to which the touch position of the external force applied on the touch panel 2 belongs is P6 according to the comparison between the report values and the truth table of table 1. When the report value of the pressure sensor 32a is the first value (i.e. 0), the report value of the pressure sensor 32b is the first value (i.e. 0), the report value of the pressure sensor 32c is the first value (i.e. 0) and the report value of the pressure sensor 32d is the second value (i.e. 1), the processor 33 confirms the actual touch area to which the touch position of the external force applied on the touch panel 2 belongs is P8 according to the comparison between the report values and the truth table of table 1. When the report value of the pressure sensor 32a is the second value (i.e. 1), the report value of the pressure sensor 32b is the second value (i.e. 1), the report value of the pressure sensor 32c is the first value (i.e. 0) and the report value of the pressure sensor 32d is the first value (i.e. 0), the processor 33 confirms the actual touch area to which the touch position of the external force applied on the touch panel 2 belongs is P1 according to the comparison between the report values and the truth table of table 1. When the report value of the pressure sensor 32a is the second value (i.e. 1), the report value of the pressure sensor 32b is the first value (i.e. 0), the report value of the pressure sensor 32c is the second value (i.e. 1) and the report value of the pressure sensor 32d is the first value (i.e. 0), the processor 33 confirms the actual touch area to which the touch position of the external force applied on the touch panel 2 belongs is P3 according to the comparison between the report values and the truth table of table 1. When the report value of the pressure sensor 32a is the second value (i.e. 1), the report value of the pressure sensor 32b is the second value (i.e. 1), the report value of the pressure sensor 32c is the second value (i.e. 1) and the report value of the pressure sensor 32d is the second value (i.e. 1), the processor 33 confirms the actual touch area to which the touch position of the external force applied on the touch panel 2 belongs is P4 according to the comparison between the report values and the truth table of table 1. When the report value of the pressure sensor 32a is the first value (i.e. 0), the report value of the pressure sensor 32b is the second value (i.e. 1), the report value of the pressure sensor 32c is the first value (i.e. 0) and the report value of the pressure sensor 32d is the second value (i.e. 1), the processor 33 confirms the actual touch area to which the touch position of the external force applied on the touch panel 2 belongs is P5 according to the comparison between the report values and the truth table of table 1. When the report value of the pressure sensor 32a is the first value (i.e. 0), the report value of the pressure sensor 32b is the first value (i.e. 0), the report value of the pressure sensor 32c is the second value (i.e. 1) and the report value of the pressure sensor 32d is the second value (i.e. 1), the processor 33 confirms the actual touch area to which the touch position of the external force applied on the touch panel 2 belongs is P7 according to the comparison between the report values and the truth table of table 1. When the report value of the pressure sensor 32a is the first value (i.e. 0), the report value of the pressure sensor 32b is the first value (i.e. 0), the report value of the pressure sensor 32c is the first value (i.e. 0) and the report value of the pressure sensor 32d is the first value (i.e. 0), the processor 33 confirms no actual touch area to which the touch position of the external force applied on the touch panel 2 belongs according to the comparison between the report values and the truth table of table 1.

TABLE 1

An exemplary truth table recording the information of the actual touch areas of the touch device corresponding to different report values associated with the plurality of pressure sensors.

| Report values associated with the plurality of pressure sensors 32a/32b/32c/32d | Actual touch area to which the touch position of the external force applied on the touch panel belongs |
|---|---|
| 1000 | P0 |
| 0100 | P2 |
| 0010 | P6 |
| 0001 | P8 |
| 1100 | P1 |
| 1010 | P3 |
| 1111 | P4 |
| 0101 | P5 |
| 0011 | P7 |
| 0000 | no |

Figure 5A:
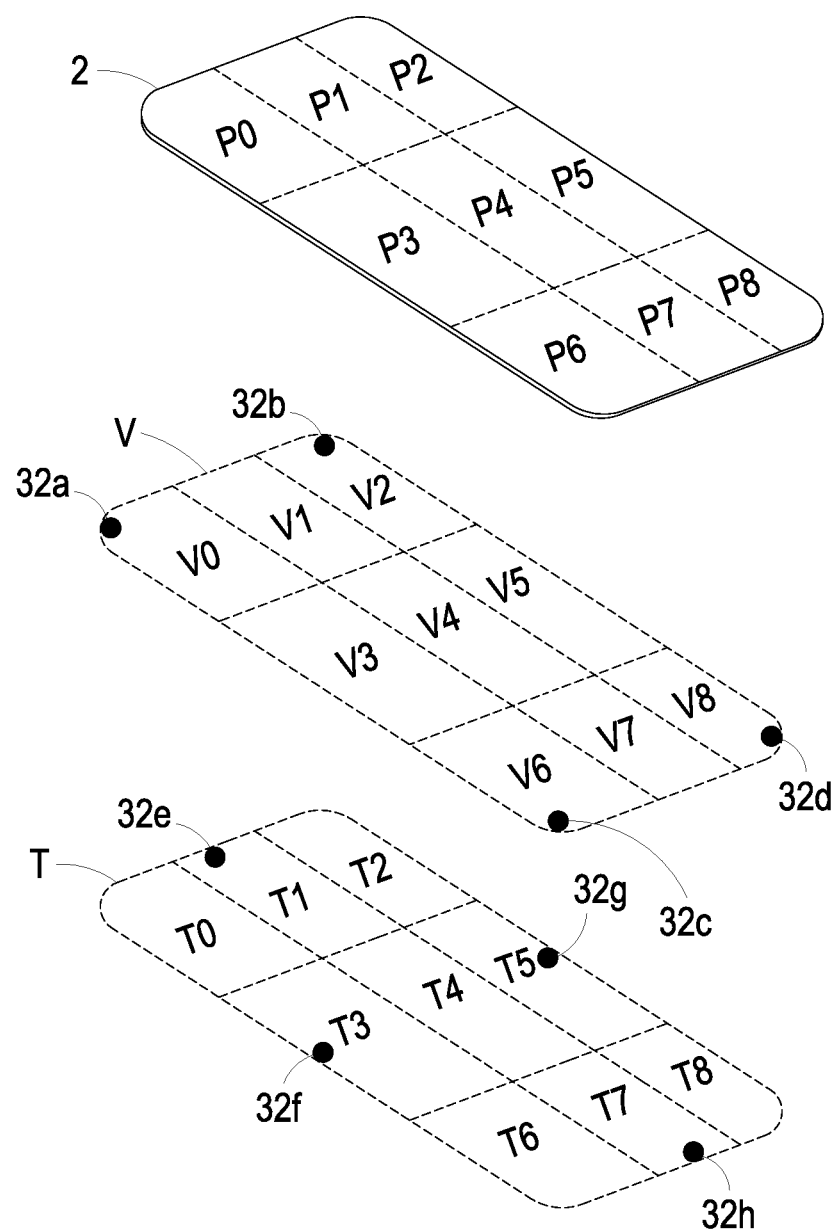
FIG. 5A is a schematic exploded view illustrating a touch panel, a capacitive touch sensor and a plurality of pressure sensors of the touch device of FIG. 2 according to a second embodiment of the present invention.
Figure 5B:
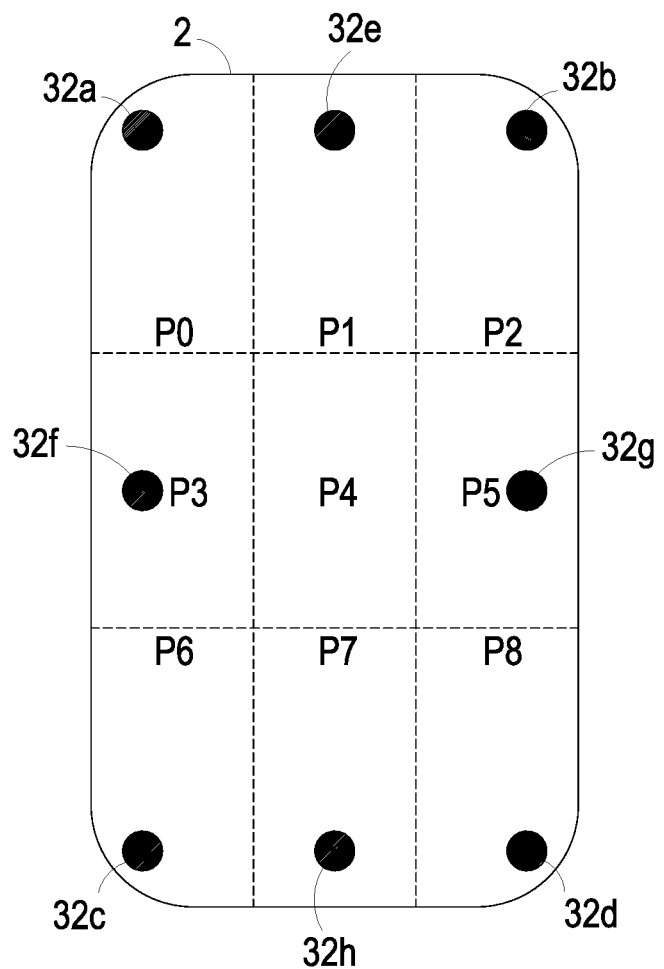
FIG. 5B is a schematic perspective view illustrating the assembly of the touch panel, the capacitive touch sensor and the plurality of pressure sensors of the touch device of FIG. 5A.

FIG. 5A is a schematic exploded view illustrating a touch panel, a capacitive touch sensor and a plurality of pressure sensors of the touch device of FIG. 2 according to a second embodiment of the present invention. FIG. 5B is a schematic perspective view illustrating the assembly of the touch panel, the capacitive touch sensor and the plurality of pressure sensors of the touch device of FIG. 5A. Table 2 is an exemplary truth table recording the information of the actual touch area of the touch device corresponding to different report values associated with the plurality of pressure sensors. In some embodiments, for adjusting the touch position of the external force applied on the touch panel 2 by the user precisely, the number of the pressure sensors of the touch device 1 is not limited to four (as shown in FIGS. 4A and 4B). As shown in FIGS. 5A and 5B, the touch device 1 includes eight pressure sensors 32a, 32b, 32c, 32d, 32e, 32f, 32g and 32h. The four pressure sensors 32a, 32b, 32c and 32d are collectively configured as the virtual touch panel V. The four pressure sensors 32e, 32f, 32g and 32h are collectively configured as the other virtual touch panel T. The virtual touch panel V and the virtual touch panel T are stacked with each other. The virtual touch panel V includes a plurality of virtual touch areas, for example, nine virtual touch areas V0, V1, V2, V3, V4, V5, V6, V7 and V8. Each of the nine virtual touch areas V0, V1, V2, V3, V4, V5, V6, V7 and V8 is corresponding in position to one of the plurality of actual touch areas. The virtual touch panel T includes a plurality of virtual touch areas, for example, nine virtual touch areas T0, T1, T2, T3, T4, T5, T6, T7 and T8. Each of the nine virtual touch areas T0, T1, T2, T3, T4, T5, T6, T7 and T8 is corresponding in position to one of the plurality of actual touch areas. For example, the virtual touch areas V0 and T0 are corresponding in position to the actual touch area P0. The virtual touch areas V1 and T1 are corresponding in position to the actual touch area P1. The virtual touch areas V2 and T2 are corresponding in position to the actual touch area P2. The virtual touch areas V3 and T3 are corresponding in position to the actual touch area P3. The virtual touch areas V4 and T4 are corresponding in position to the actual touch area P4. The virtual touch areas V5 and T5 are corresponding in position to the actual touch area P5. The virtual touch areas V6 and T6 are corresponding in position to the actual touch area P6. The virtual touch areas V7 and T7 are corresponding in position to the actual touch area P7. The virtual touch areas V8 and T8 are corresponding in position to the actual touch area P8. The arrangements of the virtual touch areas V0, V1, V2, V3, V4, V5, V6, V7 and V8 and the arrangements of the virtual touch areas T0, T1, T2, T3, T4, T5, T6, T7 and T8 are similar to that of the embodiment of FIGS. 4A and 4B, and are not redundantly described hereafter. The eight pressure sensors 32a, 32b, 32c, 32d, 32e, 32f, 32g and 32h are disposed around the periphery of the touch panel 2. The four pressure sensors 32a, 32b, 32c, 32d are arranged at four corners of the touch panel 2, and the four pressure sensors 32e, 32f, 32g, 32h are arranged at the middle of four sides of the touch panel 2. The pressure sensor 32a is adjacent to the virtual touch areas V0 and T0. The pressure sensor 32b is adjacent to the virtual touch areas V2 and T2. The pressure sensor 32c is adjacent to the virtual touch areas V6 and T6. The pressure sensor 32d is adjacent to the virtual touch areas V8 and T8. The pressure sensor 32e is adjacent to the virtual touch areas V1 and T1. The pressure sensor 32f is adjacent to the virtual touch areas V3 and T3. The pressure sensor 32g is adjacent to the virtual touch areas V5 and T5. The pressure sensor 32h is adjacent to the virtual touch areas V7 and T7.

Moreover, in this embodiment, the touch device 1 can detect the touch position of the external force applied on the touch panel 2 by employing the pressure sensors 32a, 32b, 32c and 32d of the virtual touch panel V merely. In other embodiment, the touch device 1 can detect the touch position of the external force applied on the touch panel 2 by employing the pressure sensors 32e, 32f, 32g and 32h of the virtual touch panel T merely. In some embodiments, the touch device 1 can detect the touch position of the external force applied on the touch panel 2 by employing all of the pressure sensors 32a, 32b, 32c, 32d, 32e, 32f, 32g and 32h. Moreover, for detecting the touch position of the external force applied on the touch panel 2 precisely, the at least one predetermined pressure value includes a first pressure threshold value and a second pressure threshold value. When the external force is applied on the touch panel 2 by the user, the processor 33 determines whether the pressure value detected by each of the plurality of pressure sensors 32a, 32b, 32c, 32d, 32e, 32f, 32g, 32h is greater than the first pressure threshold value or the second pressure threshold value. The processor 33 assigns one of a first valve, a second value and a third value to each of the plurality of pressure sensors 32a, 32b, 32c, 32d, 32e, 32f, 32g, 32h as the respective report values of the pressure sensors 32a, 32b, 32c, 32d, 32e, 32f, 32g, 32h according to the determining results.

In an embodiment, the touch device 1 detects the touch position of the external force applied on the touch panel 2 by employing the pressure sensors 32e, 32f, 32g and 32h of the virtual touch panel T merely. When the external force is applied on the touch panel 2 by the user, the processor 33 determines whether the pressure value detected by each of the plurality of pressure sensors 32e, 32f, 32g and 32h is greater than the first pressure threshold value or the second pressure threshold value. The processor 33 assigns one of a first valve, a second value and a third value to each of the plurality of pressure sensors 32e, 32f, 32g and 32h as the respective report values of the pressure sensors 32e, 32f, 32g and 32h according to the determining results. Namely, when the pressure value detected by the pressure sensor 32e, 32f, 32g, 32h is lower than the first pressure threshold value, the processor 33 assigns the first value, for example but not limited to 0, to the pressure sensor 32e, 32f, 32g, 32h as the report value. When the pressure value detected by the pressure sensor 32e, 32f, 32g, 32h is greater than the first pressure threshold value but lower than the second pressure threshold value, the processor 33 assigns the second value, for example but not limited to 1, to the pressure sensor 32e, 32f, 32g, 32h as the report value. When the force value detected by the pressure sensors 32e, 32f, 32g, 32h is greater than the second pressure threshold value, the processor 33 assigns the third value, for example but not limited to 2, to the pressure sensor 32e, 32f, 32g, 32h as the report value. The plurality of report values associated with the plurality of pressure sensors 32e, 32f, 32g, 32h are compared with the truth table by the processor 33. According to the comparing results, the processor 33 determines the virtual touch areas T0, T1, T2, T3, T4, T5, T6, T7, T8 to which the touch position of the external force applied on the touch panel 2 belongs, so that the actual touch areas P0, P1, P2, P3, P4, P5, P6, P7, P8 to which the touch position belongs are determined. The method of obtaining the actual touch areas by utilizing the report values and the truth table in this embodiment is similar to that of the method as shown in FIGS. 4A and 4B, and are not redundantly described hereafter.

TABLE 2

An exemplary truth table recording the information of the actual touch areas of the touch device corresponding to different report values associated with the plurality of pressure sensors.

| Report values associated with the plurality of pressure sensors 32e/32f/32g/32h | Actual touch area to which the touch position of the external force applied on the touch panel belongs |
|---|---|
| 1100 | P0 |
| 1010 | P2 |
| 0101 | P6 |
| 0011 | P8 |
| 2110 | P1 |
| 1201 | P3 |
| 1111 or 2222 | P4 |
| 1021 | P5 |
| 0112 | P7 |
| 0000 | no |

Figure 6A:
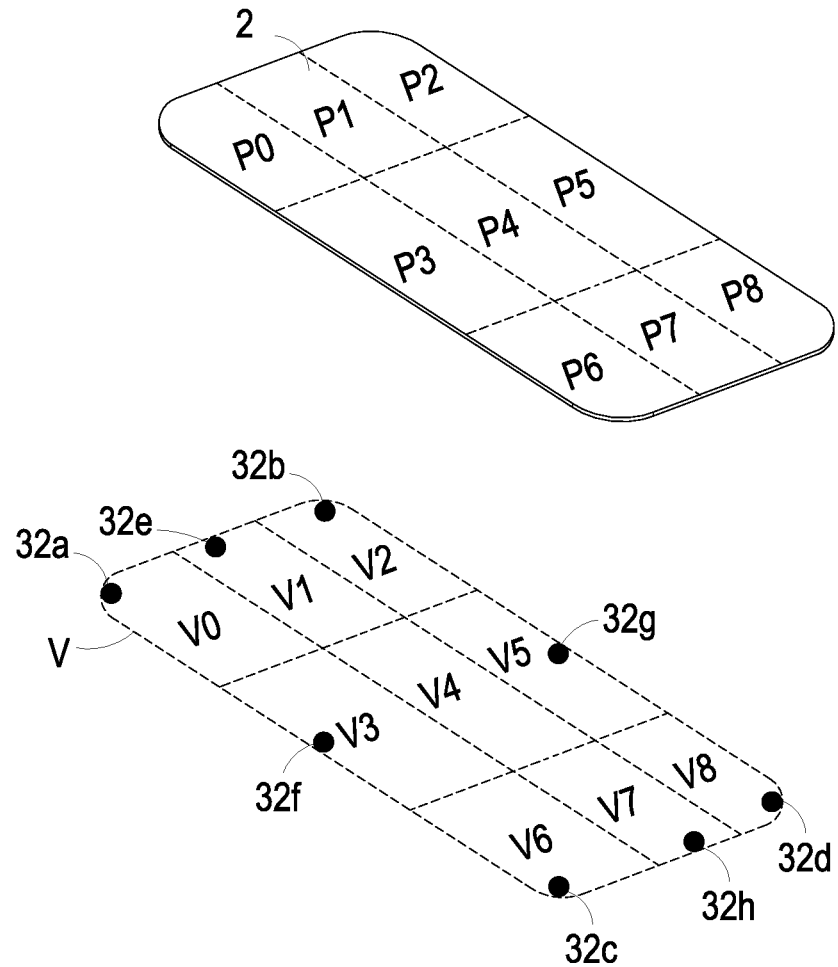
FIG. 6A is a schematic exploded view illustrating a touch panel, a capacitive touch sensor and a plurality of pressure sensors of the touch device of FIG. 2 according to a third embodiment of the present invention.
Figure 6B:
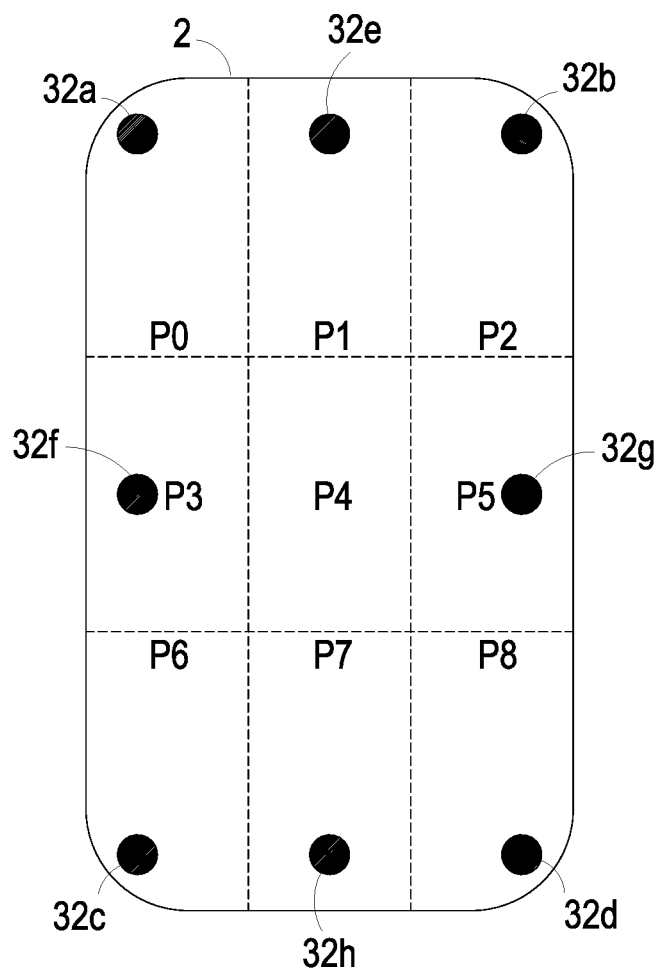
FIG. 6B is a schematic perspective view illustrating the assembly of the touch panel, the capacitive touch sensor and the plurality of pressure sensors of the touch device of FIG. 6A.

FIG. 6A is a schematic exploded view illustrating a touch panel, a capacitive touch sensor and a plurality of pressure sensors of the touch device of FIG. 2 according to a third embodiment of the present invention. FIG. 6B is a schematic perspective view illustrating the assembly of the touch panel, the capacitive touch sensor and the plurality of pressure sensors of the touch device of FIG. 6A. Table 3 is an exemplary truth table recording the information of the actual touch area of the touch device corresponding to different report values associated with the plurality of pressure sensors. As shown in FIGS. 6A and 6B, in some embodiments, the eight pressure sensors 32a, 32b, 32c, 32d, 32e, 32f, 32g and 32h are collectively configured as the virtual touch panel V. The virtual touch panel V includes a plurality of virtual touch areas, for example, nine virtual touch areas V0, V1, V2, V3, V4, V5, V6, V7 and V8. Each of the nine virtual touch areas is corresponding in position to one of the plurality of actual touch areas. For example, the virtual touch area V0 is corresponding in position to the actual touch area P0. The virtual touch area V1 is corresponding in position to the actual touch area P1. The virtual touch area V2 is corresponding in position to the actual touch area P2. The virtual touch area V3 is corresponding in position to the actual touch area P3. The virtual touch area V4 is corresponding in position to the actual touch area P4. The virtual touch area V5 is corresponding in position to the actual touch area P5. The virtual touch area V6 is corresponding in position to the actual touch area P6. The virtual touch area V7 is corresponding in position to the actual touch area P7. The virtual touch area V8 is corresponding in position to the actual touch area P8. The eight pressure sensors 32a, 32b, 32c, 32d, 32e, 32f, 32g and 32h are disposed around the periphery of the touch panel 2. The four pressure sensors 32a, 32b, 32c, 32d are arranged at four corners of the touch panel 2, and the four pressure sensors 32e, 32f, 32g, 32h are arranged at the middle of four sides of the touch panel 2. The pressure sensor 32a is adjacent to the virtual touch areas V0. The pressure sensor 32b is adjacent to the virtual touch areas V2. The pressure sensor 32c is adjacent to the virtual touch areas V6. The pressure sensor 32d is adjacent to the virtual touch areas V8. The pressure sensor 32e is adjacent to the virtual touch areas V1. The pressure sensor 32f is adjacent to the virtual touch areas V3. The pressure sensor 32g is adjacent to the virtual touch areas V5. The pressure sensor 32h is adjacent to the virtual touch areas V7.

In this embodiment, for detecting the touch position of the external force applied on the touch panel 2 precisely, the at least one predetermined pressure value includes a first pressure threshold value and a second pressure threshold value. When the external force is applied on the touch panel 2 by the user, the processor 33 determines whether the pressure value detected by each of the plurality of pressure sensors 32a, 32b, 32c, 32d, 32e, 32f, 32g, 32h is greater than the first pressure threshold value or the second pressure threshold value. The processor 33 assigns one of a first valve, a second value and a third value to each of the plurality of pressure sensors 32a, 32b, 32c, 32d, 32e, 32f, 32g, 32h as the respective report values of the pressure sensors 32a, 32b, 32c, 32d, 32e, 32f, 32g, 32h according to the determining results. Namely, when the pressure value detected by the pressure sensor 32a, 32b, 32c, 32d, 32e, 32f, 32g, 32h is lower than the first pressure threshold value, the processor 33 assigns the first value, for example but not limited to 0, to the pressure sensor 32a, 32b, 32c, 32d, 32e, 32f, 32g, 32h as the report value. When the pressure value detected by the pressure sensor 32a, 32b, 32c, 32d, 32e, 32f, 32g, 32h is greater than the first pressure threshold value but lower than the second pressure threshold value, the processor 33 assigns the second value, for example but not limited to 1, to the pressure sensor 32a, 32b, 32c, 32d, 32e, 32f, 32g, 32h as the report value. When the force value detected by the pressure sensors 32a, 32b, 32c, 32d, 32e, 32f, 32g, 32h is greater than the second pressure threshold value, the processor 33 assigns the third value, for example but not limited to 2, to the pressure sensor 32a, 32b, 32c, 32d, 32e, 32f, 32g, 32h as the report value. The plurality of report values associated with the plurality of pressure sensors 32a, 32b, 32c, 32d, 32e, 32f, 32g, 32h are compared with the truth table by the processor 33. According to the comparing results, the processor 33 determines the virtual touch areas to which the touch position of the external force applied on the touch panel 2 belongs, so that the actual touch areas to which the touch position belongs are determined. The method of obtaining the actual touch areas by utilizing the report values and the truth table in this embodiment is similar to that of the method as shown in FIGS. 4A and 4B, and are not redundantly described hereafter.

TABLE 3

An exemplary truth table recording the information of the actual touch areas of the touch device corresponding to different report values associated with the plurality of pressure sensors.

| Report values associated with the plurality of pressure sensors 32a/32b/32c/32d/32e/32f/32g/32h | Actual touch area to which the touch position of the external force applied on the touch panel belongs |
|---|---|
| 21010000 | P0 |
| 01201000 | P2 |

TABLE 3-continued

An exemplary truth table recording the information of the actual
touch areas of the touch device corresponding to different report
values associated with the plurality of pressure sensors.

| Report values associated with the plurality of pressure sensors 32a/32b/32c/32d/32e/32f/32g/32h | Actual touch area to which the touch position of the external force applied on the touch panel belongs |
|---|---|
| 00010210 | P6 |
| 00001012 | P8 |
| 12100000 or 12111000 | P1 |
| 10020100 | P3 |
| 12122121 | P4 |
| 00102001 | P5 |
| 00000121 or 00011121 | P7 |
| 00000000 | no |

Figure 7:
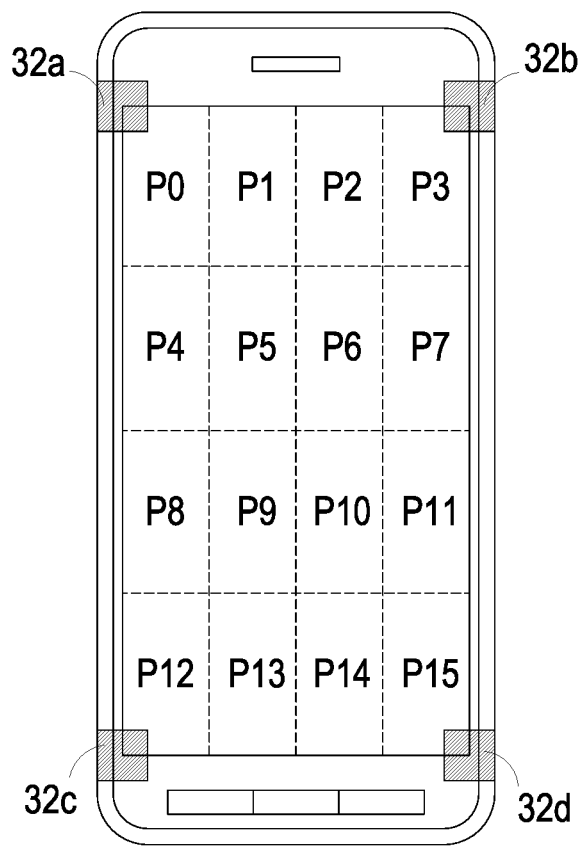
FIG. 7 is a schematic perspective view illustrating a touch panel, a capacitive touch sensor and a plurality of pressure sensors of the touch device of FIG. 2 according to a fourth embodiment of the present invention.

FIG. 7 is a schematic perspective view illustrating a touch panel, a capacitive touch sensor and a plurality of pressure sensors of the touch device of FIG. 2 according to a fourth embodiment of the present invention. Table 4 is an exemplary truth table recording the information of the actual touch areas of the touch device corresponding to different report values associated with the plurality of pressure sensors. As shown in FIG. 7, in case that the area of the touch panel 2 is bigger and the detection sensitivity of the touch panel 2 is needed to enhance, the number of the actual touch areas of the touch device 1 is not limited to nine actual touch areas as shown in FIGS. 4A and 4B. In some embodiments, as shown in FIG. 7, the touch device 1 includes sixteen actual touch areas P0, P1, P2, P3, P4, P5, P6, P7, P8, P9, P10, P11, P12, P13, P14 and P15. The sixteen actual touch areas P0, P1, P2, P3, P4, P5, P6, P7, P8, P9, P10, P11, P12, P13, P14 and P15 are distributed on the touch panel 2 evenly and arranged in a matrix of three rows and three columns. The sixteen actual touch areas P0, P1, P2, P3, P4, P5, P6, P7, P8, P9, P10, P11, P12, P13, P14 and P15 are arranged on the touch panel 2 from left to right sequentially. Each of the rows includes four actual touch areas. From left to right, the four actual touch areas P0, P1, P2, P3 are arranged on the first row of the touch panel 2 sequentially. From left to right, the four actual touch areas P4, P5, P6, P7 are arranged on the second row of the touch panel 2 sequentially. From left to right, the four actual touch areas P8, P9, P10, P11 are arranged on the third row of the touch panel 2 sequentially. From left to right, the four actual touch areas P12, P13, P14, P15 are arranged on the fourth row of the touch panel 2 sequentially. Moreover, the touch device 1 includes four pressure sensors 32 for example the pressure sensors 32a, 32b, 32c and 32d as shown in FIG. 7.

The four pressure sensors 32a, 32b, 32c and 32d are collectively configured as a virtual touch panel V (not shown). The virtual touch panel V includes a plurality of virtual touch areas, for example, sixteen virtual touch areas V0, V1, V2, V3, V4, V5, V6, V7, V8, V9, V10, V11, V12, V13, V14 and V15 (not shown). Each of the sixteen virtual touch areas is corresponding in position to one of the plurality of actual touch areas. For example, the virtual touch area V0 is corresponding in position to the actual touch area P0. The virtual touch area V1 is corresponding in position to the actual touch area P1. The virtual touch area V2 is corresponding in position to the actual touch area P2. The virtual touch area V3 is corresponding in position to the actual touch area P3. The virtual touch area V4 is corresponding in position to the actual touch area P4. The virtual touch area V5 is corresponding in position to the actual touch area P5. The virtual touch area V6 is corresponding in position to the actual touch area P6. The virtual touch area V7 is corresponding in position to the actual touch area P7. The virtual touch area V8 is corresponding in position to the actual touch area P8. The virtual touch area V9 is corresponding in position to the actual touch area P9. The virtual touch area V10 is corresponding in position to the actual touch area P10. The virtual touch area V11 is corresponding in position to the actual touch area P11. The virtual touch area V12 is corresponding in position to the actual touch area P12. The virtual touch area V13 is corresponding in position to the actual touch area P13. The virtual touch area V14 is corresponding in position to the actual touch area P14. The virtual touch area V15 is corresponding in position to the actual touch area P15. The four pressure sensors 32a, 32b, 32c and 32d are disposed around the periphery of the touch panel 2. Preferably but not exclusively, the four pressure sensors 32a, 32b, 32c and 32d are arranged at the four corners of the touch panel 2. The pressure sensor 32a is adjacent to the virtual touch area V0. The pressure sensor 32b is adjacent to the virtual touch area V3. The pressure sensor 32c is adjacent to the virtual touch area V12. The pressure sensor 32d is adjacent to the virtual touch area V15.

Moreover, for detecting the touch position of the external force applied on the touch panel 2 precisely, the at least one predetermined pressure value includes a first pressure threshold value and a second pressure threshold value. When the external force is applied on the touch panel 2 by the user, the processor 33 determines whether the pressure value detected by each of the plurality of pressure sensors 32a, 32b, 32c, 32d, 32e, 32f, 32g, 32h is greater than the first pressure threshold value or the second pressure threshold value. The processor 33 assigns one of a first valve, a second value and a third value to each of the plurality of pressure sensors 32a, 32b, 32c, 32d, 32e, 32f, 32g, 32h as the respective report values of the pressure sensors 32a, 32b, 32c, 32d, 32e, 32f, 32g, 32h according to the determining results.

When the external force is applied on the touch panel 2 by the user, the processor 33 determines whether the pressure value detected by each of the plurality of pressure sensors 32a, 32b, 32c and 32d is greater than the first pressure threshold value or the second pressure threshold value. The processor 33 assigns one of a first valve, a second value and a third value to each of the plurality of pressure sensors 32a, 32b, 32c and 32d as the respective report values of the pressure sensors 32a, 32b, 32c and 32d according to the determining results. Namely, when the pressure value detected by the pressure sensor 32a, 32b, 32c and 32d is lower than the first pressure threshold value, the processor 33 assigns the first value, for example but not limited to 0, to the pressure sensor 32a, 32b, 32c and 32d as the report value. When the pressure value detected by the pressure sensor 32a, 32b, 32c and 32d is greater than the first pressure threshold value but lower than the second pressure threshold value, the processor 33 assigns the second value, for example but not limited to 1, to the pressure sensor 32a, 32b, 32c and 32d as the report value. When the force value detected by the pressure sensors 32a, 32b, 32c and 32d is greater than the second pressure threshold value, the processor 33 assigns the third value, for example but not limited to 2, to the pressure sensor 32a, 32b, 32c and 32d as the report value. The plurality of report values associated with the plurality of pressure sensors 32a, 32b, 32c and 32d are compared with the truth table by the processor 33. According to the comparing results, the processor 33 determines the virtual touch areas to which the touch position of the external force applied on the touch panel 2 belongs, so that the actual touch areas to which the touch position belongs are determined. The method of obtaining the actual touch areas by utilizing the report values and the truth table in this embodiment is similar to that of the method as shown in FIGS. 4A and 4B, and are not redundantly described hereafter.

TABLE 4

An exemplary truth table recording the information of the actual touch areas of the touch device corresponding to different report values associated with the plurality of pressure sensors

| Report values associated with the plurality of pressure sensors 32a/32b/32c/32d | Actual touch area to which the touch position of the external force applied on the touch panel |
|---|---|
| 2000 | P0 |
| 2100 | P1 |
| 1200 | P2 |
| 0002 | P3 |
| 2010 | P4 |
| 2110 | P5 |
| 1201 | P6 |
| 0201 | P7 |
| 1020 | P8 |
| 1021 | P9 |
| 0112 | P10 |
| 0102 | P11 |
| 0020 | P12 |
| 0021 | P13 |
| 0012 | P14 |
| 0002 | P15 |
| 0000 | no |

Figure 8:
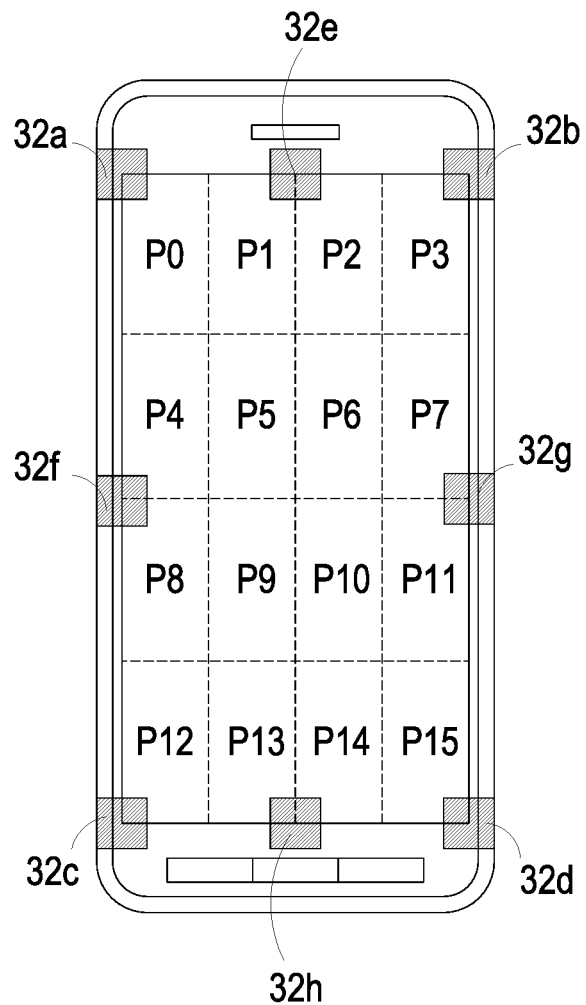
FIG. 8 is a schematic perspective view illustrating a touch panel, a capacitive touch sensor and a plurality of pressure sensors of the touch device of FIG. 2 according to a fifth embodiment of the present invention.

FIG. 8 is schematic exploded view illustrating a touch panel, a capacitive touch sensor and a plurality of pressure sensors of the touch device of FIG. 2 according to a fifth embodiment of the present invention. Table 5 is an exemplary truth table recording the information of the actual touch area of the touch device corresponding to different report values associated with the plurality of pressure sensors. Please refer to FIGS. 1 to 3 and 8, in some embodiments, the number of the pressure sensors 32 is not limited to four and the number of the actual touch areas of the touch panel 2 is not limited to nine as shown in the embodiment of FIGS. 4A and 4B. In this embodiment, the touch device 1 includes eight pressure sensors 32a, 32b, 32c, 32d, 32e, 32f, 32g and 32h and sixteen actual touch areas P0, P1, P2, P3, P4, P5, P6, P7, P8, P9, P10, P11, P12, P13, P14 and P15. The positions and arrangements of the actual touch areas and the virtual touch areas of FIG. 8 are similar to that of the actual touch areas and the virtual touch areas of FIG. 7, and are not redundantly described hereafter. The eight pressure sensors 32a, 32b, 32c, 32d, 32e, 32f, 32g and 32h are disposed around the periphery of the touch panel 2. The four pressure sensors 32a, 32b, 32c, 32d are arranged at four corners of the touch panel 2, and the four pressure sensors 32e, 32f, 32g, 32h are arranged at the middle of four sides of the touch panel 2. The pressure sensor 32a is adjacent to the virtual touch area V0. The position of the pressure sensor 32b is adjacent to the virtual touch area V3. The pressure sensor 32c is adjacent to the virtual touch area V12. The pressure sensor 32d is adjacent to the virtual touch area V15. The pressure sensor 32e is adjacent to the virtual touch area between V1 and V2. The pressure sensor 32f is adjacent to the virtual touch area between V4 and V8. The pressure sensor 32g is adjacent to the virtual touch area between V7 and V11. The pressure sensor 32h is adjacent to the virtual touch area between V13 and V14.

When the external force is applied on the touch panel 2 by the user, the processor 33 determines whether the pressure value detected by each of the plurality of pressure sensors 32a, 32b, 32c, 32d, 32e, 32f, 32g, 32h is greater than the first pressure threshold value. The processor 33 assigns one of a first valve and a second value to each of the plurality of pressure sensors 32a, 32b, 32c, 32d, 32e, 32f, 32g, 32h as the respective report values of the pressure sensors 32a, 32b, 32c, 32d, 32e, 32f, 32g, 32h according to the determining results. Namely, when the pressure value detected by the pressure sensor 32a, 32b, 32c, 32d, 32e, 32f, 32g, 32h is lower than the first pressure threshold value, the processor 33 assigns the first value, for example but not limited to 0, to the pressure sensor 32a, 32b, 32c, 32d, 32e, 32f, 32g, 32h. When the pressure value detected by the pressure sensor 32a, 32b, 32c, 32d, 32e, 32f, 32g, 32h is greater than the first pressure threshold value, the processor 33 assigns the second value, for example but not limited to 1, to the pressure sensor 32a, 32b, 32c, 32d, 32e, 32f, 32g, 32h as the report value. The plurality of report values associated with the plurality of pressure sensors 332a, 32b, 32c, 32d, 32e, 32f, 32g, 32h are compared with the truth table by the processor 33. According to the comparing results, the processor 33 determines the virtual touch areas to which the touch position of the external force applied on the touch panel 2 belongs, so that the actual touch areas to which the touch position belongs are determined. The method of obtaining the actual touch areas by utilizing the report values and the truth table in this embodiment is similar to that of the method as shown in FIGS. 4A and 4B, and are not redundantly described hereafter.

TABLE 5

An exemplary truth table illustrating the information of the actual touch areas of the touch device corresponding to different report values associated with the plurality of pressure sensors.

| Report values associated with the plurality of pressure sensors 32a/32b/32c/32d/32e/32f/32g/32h | Actual touch area to which the touch position of the external force applied on the touch panel belongs |
|---|---|
| 10000000 | P0 |
| 11000000 | P1 |
| 01100000 | P2 |
| 00100000 | P3 |
| 10010000 | P4 |
| 11010000 | P5 |
| 01101000 | P6 |
| 00101000 | P7 |
| 00010100 | P8 |
| 00010110 | P9 |
| 00001011 | P10 |
| 00001001 | P11 |
| 00000100 | P12 |
| 00000110 | P13 |
| 00000011 | P14 |
| 00000001 | P15 |
| 00000000 | no |

It is noted that the number of the pressure sensors and the number of the actual touch areas of the touch device 1 are not limited to the above embodiments and can be adjusted according to the practical requirements, for example the detection sensitivity of the touch device 1. Moreover, from the above embodiments, the number of the pressure sensors 32 is added or the number of the report values of each of the pressure sensors 32 is added because of the increasing of the number of the actual touch areas, so that the processor 33 detects the touch position of the external force applied on the touch panel 2 precisely.

In some embodiments, the touch device 1 further includes a physical button 4 disposed on any position of a non-touch control area of the touch device 1. Perfectly, the physical button 4 is disposed on the lateral side of the touch device 1 as shown in FIG. 2. When the physical button 4 is pressed by the user, the capacitive touch sensor 31 is inactivated under control of the touch device 1. When the physical button 4 is not pressed by the user, the capacitive touch sensor 31 is activated continuously under control of the touch device 1. In some embodiments, the touch device 1 further includes a liquid detector disposed on any position of the non-touch control area of the touch device 1 to detect whether the touch device 1 is in contact with liquid. Perfectly, the liquid detector is disposed on the lateral side of the touch device 1. The processor 33 determines whether the touch device 1 is in contact with the liquid or located under the water through the liquid detector. When the liquid detector detects that the touch device 1 is in contact with the liquid, the capacitive touch sensor 31 is inactivated under control of the processor 33. When the liquid detector detects that the touch device 1 is not in contact with the liquid, the capacitive touch sensor 31 is activated continuously under control of the processor 33.

Figure 9:
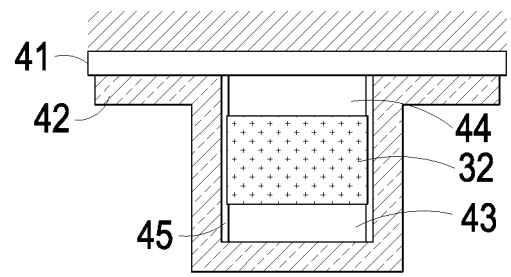
FIG. 9 is a schematic perspective view illustrating a first exemplary structure for mounting the pressure sensor of the touch device of FIG. 2, wherein the pressure sensor is disposed on a substrate of the touch device.

FIG. 9 is a schematic perspective view illustrating a first exemplary structure for mounting the pressure sensor in the touch device of FIG. 2, wherein the pressure sensor is disposed on a substrate of the touch device. As shown in FIGS. 2, 3 and 9, the touch device 1 further includes a substrate 41 and a fixing unit 42. The substrate 41 is disposed in a casing (not shown) of the touch device 1 for carrying the electronic device within the touch device 1, for example, the capacitive touch sensor 31 and the plurality of pressure sensors 32. The fixing unit 42 is fastened to the substrate 41 and includes an accommodation space 45. The pressure sensor 32 is disposed within the accommodation space 45. However, the size of the pressure sensor 32 may be varied due to the production tolerance. Under this circumstance, the pressure sensor 32 is disposed within the accommodation space 45 unstably. In some embodiments, in order to address the above-mentioned issues, the touch device 1 further includes a first buffer layer 43 and a second buffer layer 44. Both of the first buffer layer 43 and the second buffer layer 44 are flexible and disposed within the accommodation space 45, respectively. The pressure sensor 32 is located between the first buffer layer 43 and the second buffer layer 44. The second buffer layer 44 is located between the pressure sensor 32 and the substrate 41. In case that the size of the pressure sensor 32 is varied due to the production tolerance, the first buffer layer 43 and the second buffer layer 44 collectively compensate the size variation of the pressure sensor 32 by utilizing the flexible characteristics of the first buffer layer 43 and the second buffer layer 44. Therefore, the pressure sensor 32 is disposed on the substrate 41 firmly and stably and the demand of the fabrication tolerance compensation is achieved.

Figure 10:
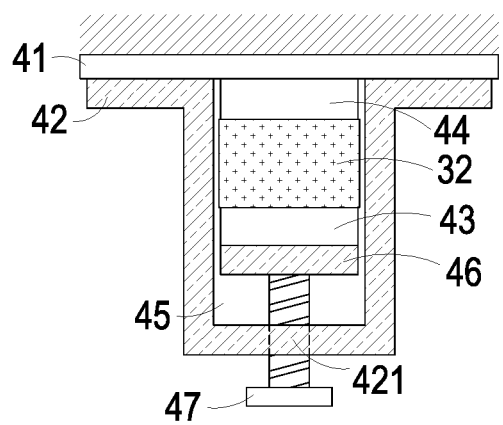
FIG. 10 is a schematic perspective view illustrating a second exemplary structure for mounting the pressure sensor in the touch device of FIG. 2, wherein the pressure sensor is disposed on a substrate of the touch device.

FIG. 10 is a schematic perspective view illustrating a second exemplary structure for mounting the pressure sensor in the touch device of FIG. 2, wherein the pressure sensor is disposed on a substrate of the touch device. As shown in FIGS. 2, 3 and 10, the touch device 1 includes the substrate 41, the fixing unit 42, the first buffer layer 43 and the second buffer layer 44. In addition, the touch device 1 further includes a fixing layer 46 and an adjustment component 47. The fixing layer 46 is disposed within the accommodation space 45 and is attached to the first buffer layer 43. The adjustment component 47 is but not limited to a screw. The adjustment component 47 has one end passing through a first hole 421 of the fixing unit 42 and abutting against the fixing layer 46. The adjustment component 47 can be adjusted to lock with the fixing unit 42 as the adjustment component 47 is screwed toward the substrate 41. Meanwhile, the fixing layer 46 is also moved toward the substrate 41. Consequently, the pressure sensor 32 is disposed on the substrate 41 firmly and stably and the size variation of the pressure sensor 32 resulting from the production tolerance is compensated. Hence, the calibration issue is solved.

Figure 11:
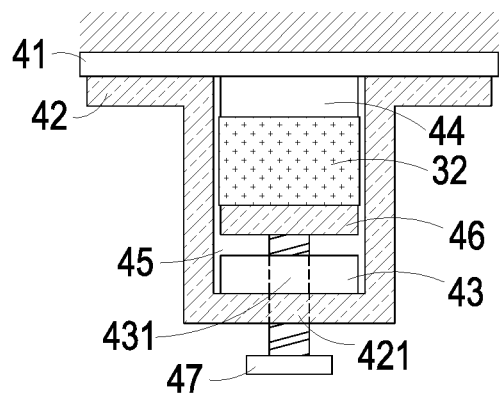
FIG. 11 is a schematic perspective view illustrating a third exemplary structure for mounting the pressure sensor of the touch device of FIG. 2, wherein the pressure sensor is disposed on a substrate of the touch device.

FIG. 11 is a schematic perspective view illustrating a third exemplary structure for mounting the pressure sensor in the touch device of FIG. 2, wherein the pressure sensor is disposed on a substrate of the touch device. As shown in FIGS. 2, 3 and 11, in other embodiment, the position of the fixing layer 46 and the adjustment component 47 are not limited to the position of the fixing layer 46 and the adjustment component 47 of FIG. 10. As shown in FIG. 11, the fixing layer 46 is disposed within the accommodation space 45 and located between the pressure sensor 32 and the first buffer layer 43. The adjustment component 47 has one end passing through the first hole 421 of the fixing unit 42 and a second fixing hole 431 of the first buffer layer 43 and abutting against the fixing layer 46. The adjustment component 47 can be adjusted to lock with the fixing unit 42 as the adjustment component 47 is screwed toward the substrate 41. Meanwhile, the fixing layer 46 is also moved toward the substrate 41 so as to fix the pressure sensor 32 and the second buffer layer 44 in the accommodation space 45. The functions and structures of the fixing layer 46 and the adjustment component 47 of FIG. 11 are similar to that of the fixing layer 46 and the adjustment component 47 of FIG. 10, and are not redundantly described hereafter.

Figure 12A:
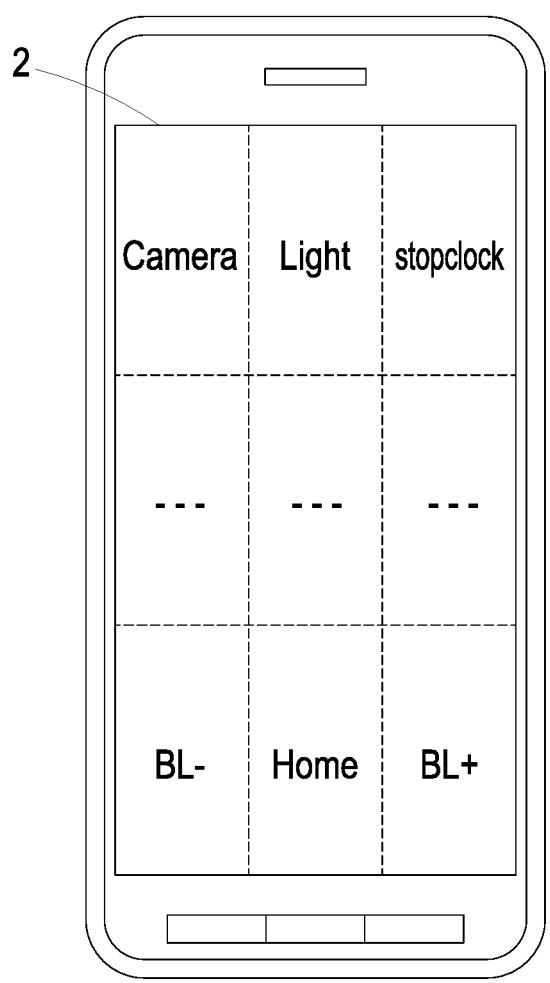
FIG. 12A is a schematic perspective view illustrating a first exemplary configuration of the touch device of FIG. 2, which is applied to the mobile phone.

FIG. 12A is a schematic perspective view illustrating a first exemplary configuration of the touch device of FIG. 2, which is applied to the mobile phone. As shown in FIGS. 12A and 2, the touch panel 2 includes nine actual touch areas. The nine actual touch areas are distributed on the touch panel 2 evenly and arranged in a matrix of three rows and three columns. When the capacitive touch sensor 31 is abnormal (for example the touch panel 2 is in contact with water), the mobile phone is entered to a menu mode. Meanwhile, each of the actual touch areas is corresponding to one of the different functions of the mobile phone. From left to right, the functions of the mobile phone corresponding to the actual touch areas arranged on the first row of the touch panel 2 are camera function, flashlight function and stopwatch function sequentially. From left to right, the functions of the mobile phone corresponding to the actual touch areas arranged on the third row of the touch panel 2 are light increasing function, main screen function and light decreasing function sequentially. The functions of the mobile phone corresponding to the actual touch areas arranged on the second row of the touch panel 2 can be increased according to the demand, and is not redundantly described herein.

Figure 12B:
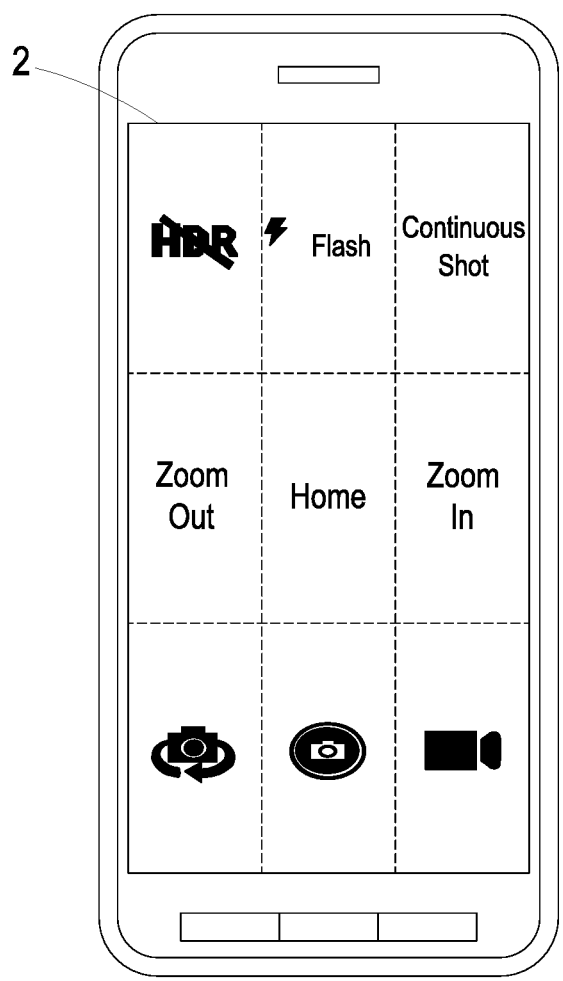
FIG. 12B is a schematic perspective view illustrating a second exemplary configuration of the touch device of FIG. 2, which is applied to the mobile phone.

FIG. 12B is a schematic perspective view illustrating a second exemplary configuration of the touch device of FIG. 2, which is applied to the mobile phone. As shown in FIGS. 2, 12A and 12B, after the user chooses the camera function of the menu mode of FIG. 12A, each of the actual touch areas is corresponding to one of the different camera functions. From left to right, the camera functions corresponding to the actual touch areas arranged on the first row of the touch panel 2 are camera function, flashlight function and stopwatch function sequentially. From left to right, the functions of the mobile phone corresponding to the actual touch areas arranged on the first row of the touch panel 2 are HDR function, flashlight function and continuous camera function sequentially. From left to right, the functions of the mobile phone corresponding to the actual touch areas arranged on the second row of the touch panel 2 are zoom in function, main screen function and zoom out function sequentially. From left to right, the functions of the mobile phone corresponding to the actual touch areas arranged on the third row of the touch panel 2 are selfie function, camera function and recording function sequentially. It is noted that the camera functions of the present invention is not limited to the functions mentioned above and can be varied according to the practical requirements.

Figure 12C:
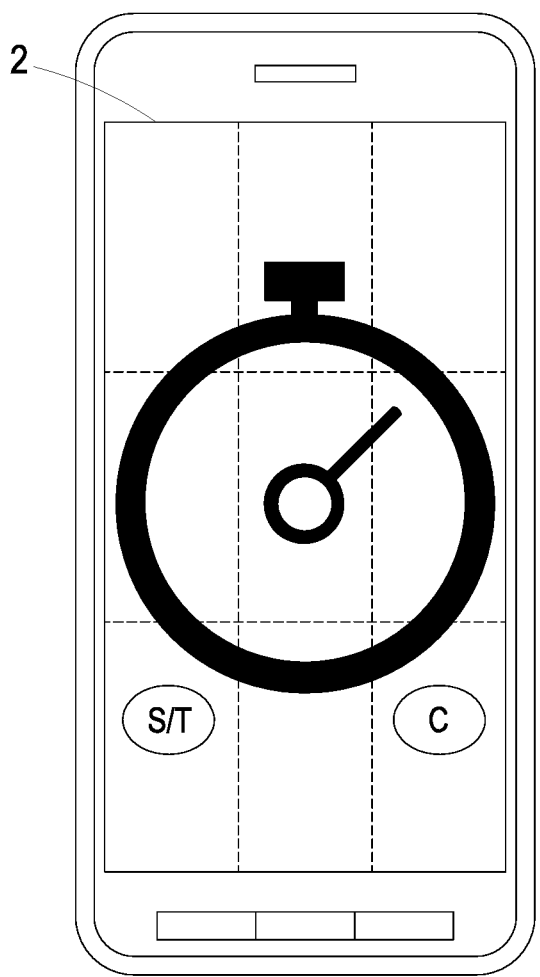
FIG. 12C is a schematic perspective view illustrating a third exemplary configuration of the touch device of FIG. 2, which is applied to the mobile phone.

FIG. 12C is a schematic perspective view illustrating a third exemplary configuration of the touch device of FIG. 2, which is applied to the mobile phone. As shown in FIGS. 2, 12A and 12C, after the user chooses the stopwatch function of the menu mode of FIG. 12A, each of the actual touch areas is corresponding to one of the different stopwatch functions. The stopwatch function corresponding to the actual touch area arranged on an intersection of the third row and the first column of the touch panel 2 is start/stop function. The stopwatch function corresponding to the actual touch area arranged on an intersection of the third row and the third column of the touch panel 2 is restart function. The stopwatch functions corresponding to the other actual touch areas of the touch panel 2 is the stopwatch status display function. It is noted that the stopwatch functions of the present invention is not limited to the functions mentioned above and can be varied according to the practical requirements.

From the above descriptions, the control method of the touch device allows the plurality of pressure sensors to be activated to detect the pressure on the touch position of the touch panel while the capacitive touch sensor is probably invalid and the touch device is abnormal. Therefore, the touch device works continuously when the capacitive touch sensor is probably invalid.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a touch device, the touch device comprising a touch panel, the touch panel comprising a capacitive touch sensor and a plurality of pressure sensors, the capacitive touch sensor detecting a touch position of an external force applied on the touch panel, the plurality of pressure sensors detecting a pressure value of the external force, and disposing around the periphery of the touch panel, the control method comprising the steps of:
   (a) detecting whether the capacitive touch sensor is abnormal;
   (b) allowing the capacitive touch sensor to be inactivated under control of a processor, and allowing the plurality of pressure sensors to be activated to detect the pressure on the touch position under the control of the processor;
   (c) determining whether the pressure detected with each of the plurality of pressure sensors is greater than at least one predetermined pressure value, and assigning a plurality of report values according to intervals to which the pressure values detected by the plurality of pressure sensors belong;
   (d) comparing the plurality of report values associated with the plurality of pressure sensors with a truth table, so that the touch position of the external force applied on the touch panel is confirmed;
   (e) allowing the capacitive touch sensor to be activated to detect the touch position under control of the processor; and
   (f) confirming the touch position of the external force applied on the touch panel according to a detection information from the capacitive touch sensor and a detection information from the plurality of pressure sensors by the processor;
   wherein when the detection result of the step (a) is satisfied, the step (b) is performed, wherein the step (c) is performed after the step (b) is performed, wherein the step (d) is performed after the step (c) is performed, wherein when the detection result of the step (a) is not satisfied, the step (e) is performed, wherein the step (f) is performed after the step (e) is performed.

2. The control method according to claim 1, wherein the truth table records information of a plurality of actual touch areas of the touch device corresponding to the report values associated with the plurality of pressure sensors.

3. The control method according to claim 1, wherein the touch panel comprises a plurality of actual touch areas, the touch position is corresponding to at least one actual touch area of the plurality of actual touch areas, the truth table records information of the plurality of actual touch areas corresponding to the report values associated with the plurality of pressure sensors, and the report values associated with the plurality of pressure sensors is compared with the truth table so as to confirm the actual touch area to which the touch position of the external force applied on the touch panel belongs.

4. The control method according to claim 3, wherein the plurality of pressure sensors are collectively configured as a virtual touch panel, the virtual touch panel includes a plurality of virtual touch areas, and each of the plurality of virtual touch areas is corresponding in position to one of the plurality of actual touch areas, wherein the report values associated with the plurality of pressure sensors is compared with the truth table so that the virtual touch area to which the touch position of the external force applied on the touch panel belongs is confirmed, and the actual touch area to which the touch position of the external force applied on the touch panel belongs is confirmed.

5. The control method according to claim 1, wherein the at least one predetermined pressure value comprises a first pressure threshold value, wherein when the pressure value detected by one of the plurality of pressure sensors is lower than the first pressure threshold value, the processor assigns a first value to the one of the plurality of pressure sensors as the report value, wherein when the pressure value detected by one of the plurality of pressure sensors is greater than the first pressure threshold value, the processor assigns a second value to the one of the plurality of pressure sensors as the report value.

6. The control method according to claim 1, wherein the at least one predetermined pressure value comprises a first pressure threshold value and a second pressure threshold value, wherein when the pressure value detected by one of the plurality of pressure sensors is lower than the first pressure threshold value, the processor assigns a first value to the one of the plurality of pressure sensors as the report value, wherein when the pressure value detected by one of the plurality of pressure sensors is greater than the first pressure threshold value but lower than the second pressure threshold value, the processor assigns a second value to the one of the plurality of pressure sensors as the report value, wherein when the pressure value detected by one of the plurality of pressure sensors is greater than the second pressure threshold value, the processor assigns a third value to the one of the plurality of pressure sensors as the report value.

7. The control method according to claim 1, wherein the touch device comprises a physical button, wherein when the physical button is pressed, the capacitive touch sensor is inactivated under control of the touch device.

8. The control method according to claim 1, wherein the touch device comprises a substrate and a fixing unit, the substrate is disposed in a casing of the touch device, the fixing unit is fastened to the substrate and comprises an accommodation space, and the pressure sensor is disposed within the accommodation space.

9. The control method according to claim 8, wherein the touch device further comprises a first buffer layer and a second buffer layer, the first buffer layer and the second buffer layer are disposed within the accommodation space respectively, the pressure sensor is located between the first buffer layer and the second buffer layer, and the second buffer layer is located between the pressure sensor and the substrate.

10. The control method according to claim 9, wherein the touch device further comprises a fixing layer and an adjustment component, the fixing layer is disposed within the accommodation space and attached to the first buffer layer, the adjustment component has one end passing through a first hole of the fixing unit and abutting against the fixing layer.

11. The control method according to claim 9, wherein the touch device further comprises a fixing layer and an adjustment component, the fixing layer is disposed within the accommodation space and located between the pressure sensor and the first buffer layer, the adjustable component has one end passing through a first hole of the fixing unit and a second hole of the first buffer layer and abutting against the fixing layer.

* * * * *